United States Patent [19]
Robertson

[11] Patent Number: 5,248,421
[45] Date of Patent: Sep. 28, 1993

[54] SPIRAL FLUID SEPARATOR
[75] Inventor: Glen A. Robertson, Huntsville, Ala.
[73] Assignee: The United States of America as respresented by the Administrator of the National Aeronautics and Space Administration, Washington, D.C.
[21] Appl. No.: 958,843
[22] Filed: Oct. 9, 1992
[51] Int. Cl.[5] ............................................. B01D 21/26
[52] U.S. Cl. .................................. 210/512.1; 210/787; 209/144; 209/211; 55/459.1
[58] Field of Search ............................ 210/512.1, 787; 209/144, 211; 55/459.1

[56] References Cited
U.S. PATENT DOCUMENTS

| | | | |
|---|---|---|---|
| 3,346,117 | 9/1967 | Page | 210/512.1 |
| 3,951,813 | 4/1976 | Palma | 210/512.1 |
| 5,004,552 | 4/1991 | Al-Yazdi | 210/512.1 |

Primary Examiner—Robert A. Dawson
Assistant Examiner—David Reifsnyder
Attorney, Agent, or Firm—Kent N. Stone; Robert L. Broad, Jr.; Guy M. Miller

[57] ABSTRACT

A fluid separator for separating particulate matter such as contaminates is provided which includes a series of spiral tubes of progressively decreasing cross sectional area connected in series. Each tube has an outlet on the outer curvature of the spiral. As fluid spirals down a tube, centrifugal force acts to force the heavier particulate matter to the outer wall of the tube, where it exits through the outlet. The remaining, and now cleaner, fluid reaches the next tube, which is smaller in cross sectional area, where the process is repeated. The fluid which comes out the final tube is diminished of particulate matter.

1 Claim, 2 Drawing Sheets

SPIRAL FLUID SEPARATOR

ORIGIN OF THE INVENTION

The invention described herein was made by an employee of the United States Government and may be manufactured and used by or for the government for government purposes without the payment of any royalties thereon or therefor.

BACKGROUND OF THE INVENTION

The present invention relates to a high flow volume fluid separator which operates on the principle that the centrifugal force induced by a fluid medium flowing in a spiral path causes the heavier particles suspended in the fluid to be pushed to the outer edges of the spiral, whereby they can be separated from the lighter fluid medium and collected.

There is a growing need for a high volume fluid separator which can separate contaminates from fluids in large quantities. The planned Space Station and lunar/Mars mission have a need for such a fluid separator which can be used in their waste water fluid management systems to separate contaminates prior to recycling the water. There is also a need for such a high flow volume fluid separator which can be used to separate contaminates from sea water prior to its being used in evaporators. Another application is to separate oil from fresh or sea water and earth during oil spill clean up operations.

The prior art of centrifugal separation of contaminates from fluids usually required that small fluid quantities be placed in containers and spun at high speeds, which entailed many days to process small quantities of fluids.

SUMMARY OF THE INVENTION

It is an object of the present invention to provide a simple, high volume fluid separator which may be used in a variety of applications. These applications include the separation of contaminates from waste, sea, or brine water, and the separation of fluids, such as oil and water. The present invention is directed to a fluid separator which utilizes the centrifugal force produced on a fluid traveling along a spiral path. The present invention provides outlets on the outer portions of the spiral path, which allow the heavier materials or fluids in the fluid to be extracted from the fluid medium.

In the preferred embodiment of the invention, several spiral tubes with decreasing cross sectional areas are connected in series. The first spiral tube has provision for input of the fluid. A pump is used to move the fluid from its storage reservoir and to insert the fluid into the first tube such that the entire cross sectional area of the tube is full. The fluid entering the first tube begins to follow the spiral path which induces a centrifugal force on the fluid and any heavier particles such as contaminates in it. As a result these heavier materials are forced toward the outer wall of the tube. At the point where each spiral tube is connected to the next, an outlet is placed on the outer curvature of the spiral. This outlet allows the heavier, or more contaminated, materials within the fluid which have been forced to the outer wall to be extracted, but allows the lighter, or cleaner, remaining fluid to continue into the next spiral tube. The next spiral tube is of a lesser cross sectional area than the previous spiral tube. It can be seen that when the next tube is of a cross sectional area equal to the cross sectional area of the previous tube minus the cross sectional area of the outlet of the previous tube, an even transitional flow of fluid is achieved. Vanes located within each tube may be used to further enhance the stability of the flow, which increases the effectiveness of the separation of the heavier materials. Therefore, by providing such a series of spiral tubes and outlets, the fluid exiting the final tube may be diminished of heavier materials or contaminates.

A fluid separator constructed in accordance with the present invention may be constructed of a variety of materials and operated in any environment. Utilizing different spiral diameters to increase or decrease the centrifugal force, and utilizing different tube cross sectional areas to vary input flow volume, permits the invention's application to a variety of purposes.

BRIEF DESCRIPTION OF THE DRAWINGS

The particular features and advantages of the invention as well as other objects will become apparent to those of skill in the art from the following description, taken in conjunction with the drawings, in which.

DESCRIPTION OF THE PREFERRED EMBODIMENT

Figure 1:
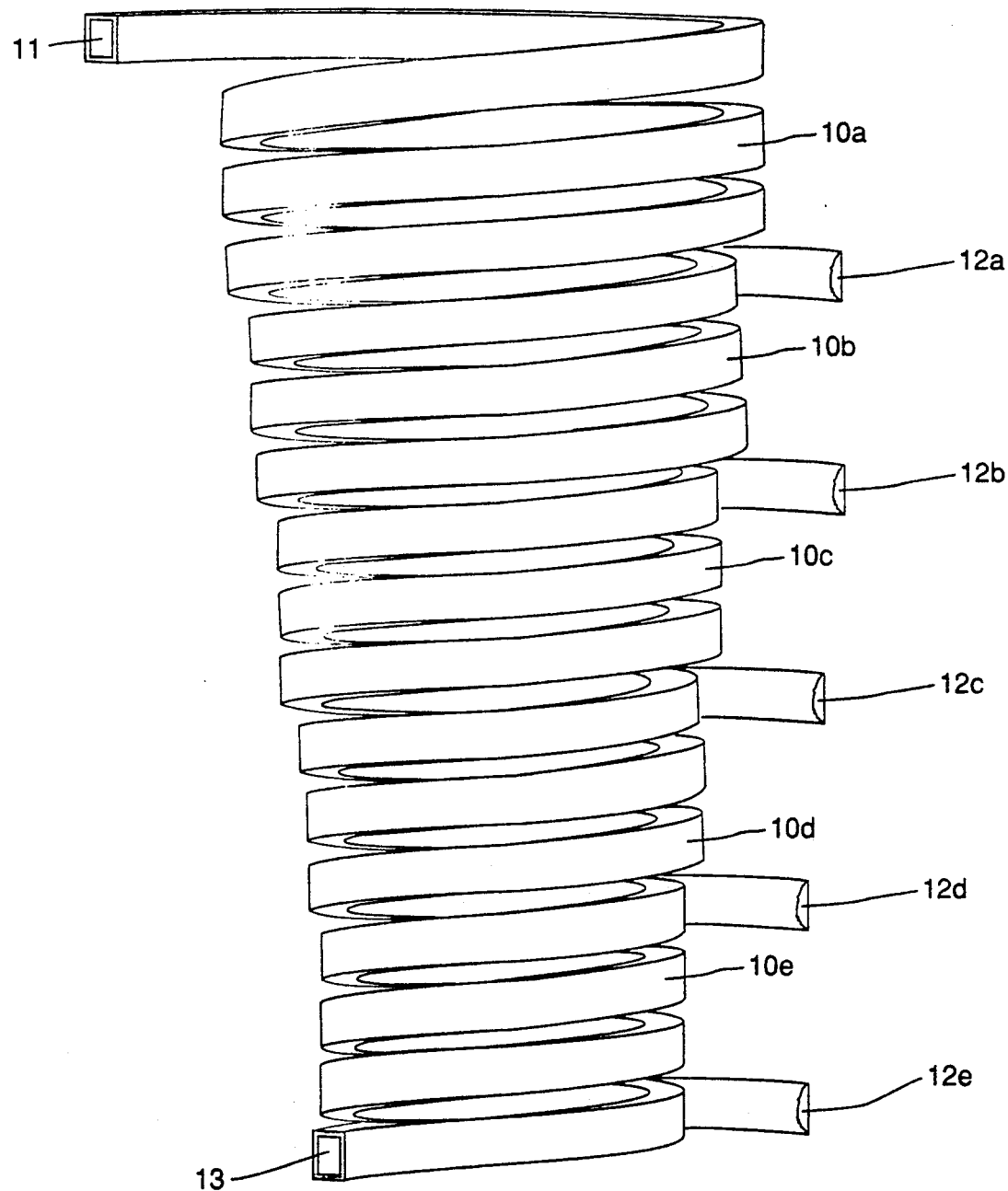
FIG. 1 is a perspective view of a five spiral fluid separator.

FIG. 1 illustrates a high flow volume fluid separator which incorporates five spiral tube sections 10a, 10b, 10c, 10d, and 10e. Each section is of lesser cross sectional area than the section before. Any number of sections may be used, five is selected for illustration only. The fluid containing the substances to be separated is fed into the first spiral section 10a which has a provision for intake 11 of the fluid. The fluid is fed from its source to the first spiral section. This may be accomplished by a pump of known kind, or any other means capable of completely filling the cross sectional area of the first tube at its intake point.

As the fluid enters through intake 11, it begins to follow a spiral path as defined by the shape of the spiral tube section 10a and continues such path through the other sections 10b, 10c, 10d, and 10e. Because a spiral is in effect a circle in three dimensions, a centrifugal force is induced on the fluid. As a result, the heavier particulates in the fluid are forced toward the outer wall of the tube. At the point where each spiral section 10 connects to the next, an outlet 12a, 12b, 12c, 12d, 12e, is placed on the outer curvature of the tube.

Figure 2:
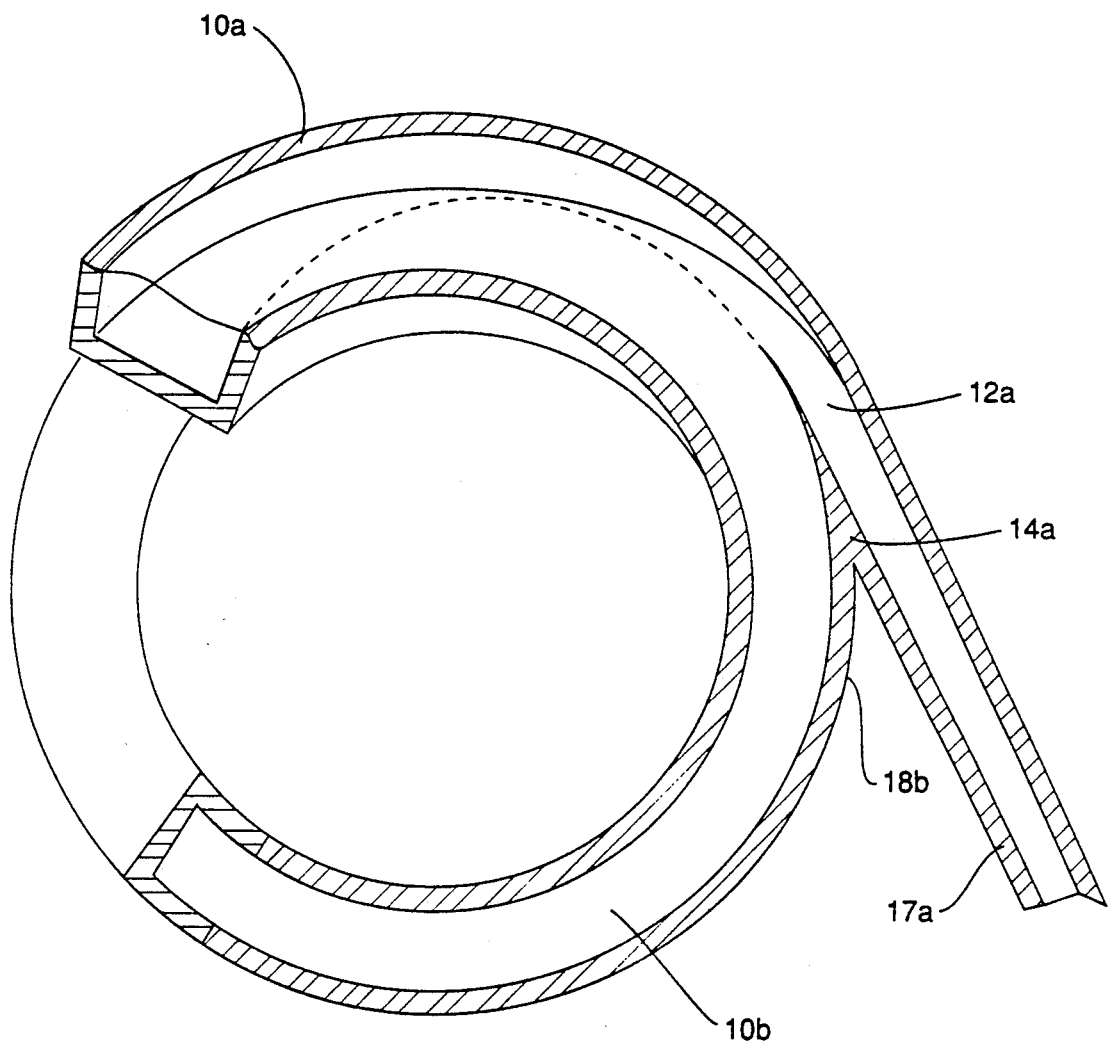
FIG. 2 is a perspective cross sectional top view of one of the spiral tubes and outlets of FIG. 1.

These outlets 12 allow the heavier particulates to be extracted, but allow the fluid, minus the heavier particulates, to continue into the next spiral tube 10. FIG. 2 illustrates the provision of a vane 14a within a spiral tube section. Such a vane straightens out the flow and increases stability of the flow. The location of the vane within each spiral section immediately before the outlet for that section assists in maintaining a stable flow of the fluid which does not go out the outlet, but instead passes on to the next spiral section. The section of a tube in close proximity to an outlet is the portion of the fluid's path most likely to encounter flow instability, hence it is the optimal location for a vane. While not necessary to the practice of the present invention, vanes will enhance its effectiveness. The vanes need not be of any particular length, but generally the longer the vane, the more it will enhance flow stability.

After the fluid has spiraled around several times in a spiral tube section, for example section 10a, the heavier particulates begin moving toward the outer wall of that spiral section 10a. Upon reaching outlet 12a, the fluid and the heaviest particulates 23 are separated. The now cleaner remaining fluid enters the next spiral tube section 10b while the heavier particulates 23 are exacted from the flow through outlet 12a. This process is repeated for each subsequent spiral tube section 10b, 10c, 10d and 10e. The vane 14a will assist in separating particulates, lowering turbulence in the fluid flow, reducing remixing of the separated particulates, and maintaining a stable flow as the remaining now cleaner fluid enters the next spiral tube section.

The vane 14a is an extension of the junction of the inner wall 17a of the outlet 12a and the outer wall 18b of the next spiral section 10b. The vane is generally wedge shaped. The more pointed end of the vane extends into the interior of the spiral tube section 10a, beyond the beginning of the outlet 12a for that section, in the direction from which the fluid flow comes.

As the fluid continues to travel down the five spiral sections 10 as described above, the fluid extracted from each outlet 12 will be freer of heavy particulates than the fluid extracted from the outlet before. The fluid reaching the final outlet 13 for the entire series of tubes will be nearly free of all heavy particulates.

What is claimed is:

1. An apparatus for separating fluids, comprising a plurality of spiral tubes connected together in series, each of said tubes having inner and outer walls, said tubes each having a spiral diameter less than the spiral diameter of the preceding tube of the series, each of said tubes having at its connection to the following tube an outlet tangent to the spiral of said tube, said outlets each having inner and outer walls with the inner wall of each outlet being connected to the outer wall of the next tube in said series, said connected walls extending into the preceding tube of the series in the form of a flat vane for reducing turbulence in the fluid, each of said tubes having a cross sectional area equal to the cross sectional area of the preceding tube in the series minus the cross sectional area of the outlet of said preceding tube.

* * * * *